(12) United States Patent
Pineau et al.

(10) Patent No.: US 9,065,983 B2
(45) Date of Patent: Jun. 23, 2015

(54) METHOD AND SYSTEMS FOR PROVIDING VIDEO DATA STREAMS TO MULTIPLE USERS

(75) Inventors: Richard Pineau, North Andover, MA (US); Adam Pineau, Haverhill, MA (US)

(73) Assignee: Oncam Global, Inc., Lowell, MA (US)

( * ) Notice: Subject to any disclaimer, the term of this patent is extended or adjusted under 35 U.S.C. 154(b) by 291 days.

(21) Appl. No.: 13/530,507

(22) Filed: Jun. 22, 2012

(65) Prior Publication Data

US 2012/0327244 A1 Dec. 27, 2012

Related U.S. Application Data

(63) Continuation-in-part of application No. 13/169,316, filed on Jun. 27, 2011.

(51) Int. Cl.
*G08B 13/19* (2006.01)
*H04N 7/18* (2006.01)
*G08B 13/196* (2006.01)

(52) U.S. Cl.
CPC .......... *H04N 7/181* (2013.01); *G08B 13/19656* (2013.01)

(58) Field of Classification Search
None
See application file for complete search history.

(56) References Cited

U.S. PATENT DOCUMENTS

| | | | |
|---|---|---|---|
| 6,831,680 B1 * | 12/2004 | Kumler | 348/148 |
| 7,092,006 B2 * | 8/2006 | Walker et al. | 348/143 |
| 7,750,936 B2 * | 7/2010 | Provinsal et al. | 348/143 |
| 8,723,951 B2 * | 5/2014 | Ahiska et al. | 348/143 |
| 8,754,946 B2 * | 6/2014 | Renkis | 348/156 |
| 2002/0097332 A1 * | 7/2002 | Martin et al. | 348/335 |
| 2004/0109061 A1 | 6/2004 | Walker et al. | |
| 2005/0091311 A1 | 4/2005 | Lund et al. | |
| 2008/0117296 A1 * | 5/2008 | Egnal et al. | 348/143 |
| 2009/0051767 A1 | 2/2009 | Iwamura | |
| 2009/0252302 A1 * | 10/2009 | Monroe | 379/37 |
| 2010/0002070 A1 * | 1/2010 | Ahiska | 348/36 |
| 2010/0289875 A1 | 11/2010 | Newton et al. | |
| 2010/0328461 A1 | 12/2010 | Renkis | |

FOREIGN PATENT DOCUMENTS

| | | | | |
|---|---|---|---|---|
| WO | 01/84839 A1 | 11/2001 | | |
| WO | WO 01/84839 | * 11/2001 | | H04N 7/14 |
| WO | 2007/060497 A2 | 5/2007 | | |

OTHER PUBLICATIONS

International Search Report dated Oct. 17, 2013 for PCT/US2013/046770.
Written Opinion dated dated Oct. 17, 2013 for PCT/US2013/046770.
Kurt Akeley Clever Uses of Open GL, http://graphics.stanford.edu/courses/cs248-07/, CS248 Lecture 16, Nov. 15, 2007.

(Continued)

*Primary Examiner* — Jay Patel
*Assistant Examiner* — Reza Aghevli
(74) *Attorney, Agent, or Firm* — Burns & Levinson LLP; Orlando Lopez

(57) ABSTRACT

A method for substantially simultaneously remote monitoring including receiving, at a server, one or more video data streams, and providing, from the server, the one or more video data streams to multiple users, each one of the multiple users being able to view and manipulate the one or more video data streams. Systems that implement the method are also disclosed.

19 Claims, 6 Drawing Sheets

(56) References Cited

OTHER PUBLICATIONS

McReynolds, Tom, Programming with OpenGL: Advanced Rendering, SIGGRAPH '96 Course.
McReynolds, Tom, Programming with OpenGL: Advanced Rendering, SIGGRAPH '97 Course.
Blythe, David et al., Advanced Graphics Programming Techniques Using OpenGL, SIGGRAPH '99 Course.
International Search Report dated Feb. 3, 2012 for PCT/US11/42002.
Written Opinion dated Feb. 3, 2012 for PCT/US11/42002.
Akeley, K. Clever Uses of Open GL, http://graphics.stanford.edu/courses/cs248-07/, CS248 Lecture 16, Nov. 15, 2007.
McReynolds, T., Programming with OpenGL: Advanced Rendering, SIGGRAPH '96 Course.
McReynolds, T., Programming with OpenGL: Advanced Rendering, SIGGRAPH '97 Course.
Blythe, D. et al., Advanced Graphics Programming Techniques Using OpenGL, SIGGRAPH '99 Course.

* cited by examiner

METHOD AND SYSTEMS FOR PROVIDING VIDEO DATA STREAMS TO MULTIPLE USERS

CROSS REFERENCE TO RELATED APPLICATIONS

This application is a continuation-in-part of a co-pending U.S. application Ser. No. 13/169,316, filed Jun. 27, 2011 entitled METHOD AND SYSTEMS FOR PROVIDING VIDEO DATA STREAMS TO MULTIPLE USERS, which is incorporated herein by reference in its entirety and for all purposes.

BACKGROUND

These teachings relate generally to the field of remote camera video viewing and control, more particularly to enable multiple users the ability to remotely access and control, via the Internet and/or Intranet, a video camera without each users command conflicting or trumping other users.

One of the major problems associated with a users ability to remotely view a live camera stream is that the viewing of such stream is, for all practical purposes, limited to one user. This poses a significant problem when a camera is tasked for multiple purposes such as crowd control, inventory monitoring, traffic monitoring and security purposes-applications that will be referred to as "monitoring applications". In the aforementioned scenarios, there might be multiple users each tasked with a different purpose for using and viewing the video stream from the IP Video Camera. Unfortunately, when more than one user attempts to view the same video stream from a single IP Video Camera, a universal method does not exist to ensure that all users are viewing the image they desire, let alone the ability to perform complex analytics on the image. In most instances, the commands from one user will trump commands from another user, which will severely limit or even eliminate the other user's ability to perform their task. In another scenario, the IP Video Camera will backlog the various commands submitted by each user and run though them in the order they are received, which will give the appearance of erratic camera behavior to all of the users. The end result is that most users will not be able to view their desired portion of the image and, as such, their ability to accomplish their task is greatly diminished. Although some Internet Protocol ("IP") cameras distribute multiple video streams, which could allow each viewer to control and manipulate his/her own stream, this is not a viable solution to the problem. At best it is a severely limited solution to having multiple users simultaneously access a single camera as the streams will burden the network and greatly increases lag time between the users command and the IP Video Camera's response, which could mean the viewers would miss some live information due to lag. Even assuming the network had the capacity to distribute various streams from a single IP Video Camera, it is unlikely that the IP Video Camera will have the processing power to allow each user to efficiently manipulate and perform analytics on his or her stream let alone the ability to allow each user to perform his or her own analytics such as tracking different object, various alarm triggering events, and color correction. Moreover, many IP Video Cameras that provide the capability to move around the image and focus on specific areas requiring the mechanical movement of the lens. Unless the lens is moved, which might contradict the desires of another user, it might not be possible or desirable to have a mechanical camera with a single mechanical lens view two different objects outside of its view.

There is therefore a need to provide a system that allows for multiple users to remotely access, control and view a single camera providing a single stream where each user's command and access will be as if they are in full control of the camera and are not conflicting with other user commands or overburdening the network.

There is therefore a need to provide a system and method that allow remote monitoring by multiple users where each user's command and access will be as if they are in full control of the camera and are not conflicting with other user commands or overburdening the network.

BRIEF SUMMARY

Systems and methods that allow for multiple users to remotely access, control and view a single camera providing a single stream where each users command and access will be as if they are in full control of the camera and are not conflicting with other user commands or overburdening the network (also referred to as "substantially simultaneously remote monitoring") are disclosed hereinbelow.

In one embodiment, the method of these teachings includes receiving, at a server, one or more video data streams, and providing, from the server, the one or more video data streams to multiple users, each one of the multiple users being able to view and manipulate the one or more video data streams.

In another embodiment, the method of these teachings includes receiving, from a server, one or more video data streams at one of multiple users, the one or more video data streams being received by other of the multiple users and having been initially received at the server from one or more sources of video data.

In one embodiment, the system of these teachings includes one or more sources of video data, and a server receiving the one or more video data streams originating from the one or more sources of video data, the server also providing the one or more video data streams to multiple users; each one of the multiple users being able to view and process the one or more video data streams.

In one instance, the system of these teachings also includes a gateway subsystem receiving the at least one video data stream from the at least one source of video data and providing the at least video data stream to the server. In another instance, the gateway subsystem determines the appropriate video stream size that is sent to the Server. For example, these teachings not be limited only to that example, the gateway can perform a network speed check and utilize the results network speed check to determine the appropriate video stream size that is sent to the server. The gateway can serve to prevent direct connection to the source of video data (in one instance, the camera) since video data is provided to the server by the gateway.

In another embodiment, the system of these teachings includes one or more sources of video data, a server receiving one or more video data streams originating from the one or more sources of video data, and a number of user subsystems, the server providing the one or more video data streams to the number of user subsystems, each one of the number of user subsystems having viewing/processing components for viewing/processing the one or more video data streams.

A number of other embodiments of the method and system of these teachings are also disclosed.

For a better understanding of the present teachings, together with other and further objects thereof, reference is made to the accompanying drawings and detailed description and its scope will be pointed out in the appended claims.

DETAILED DESCRIPTION

Figure 1:
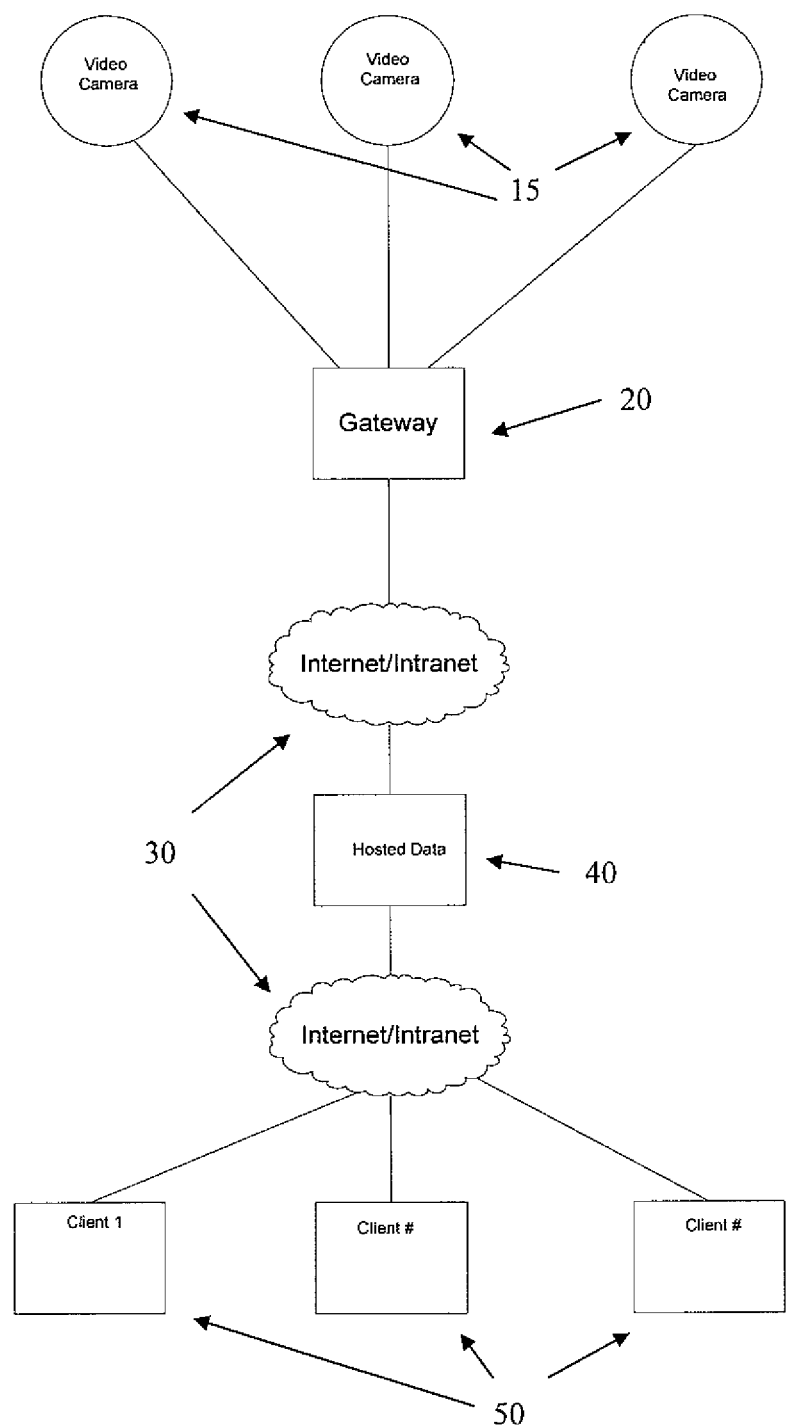
FIG. 1 is a block diagram representation of one embodiment of the system of these teachings.

The following detailed description is of the best currently contemplated modes of carrying out these teachings. The description is not to be taken in a limiting sense, but is made merely for the purpose of illustrating the general principles of these teachings, since the scope of these teachings is best defined by the appended claims.

The present teachings provide a solution to the problems associated with the current solutions as they incorporate a method and system to address the problems associated with network speed, lag time and multiple user command conflicts.

A "web browser," as used herein, is a computer readable code (software application) for retrieving, presenting, and sending information over a network such as, but not limited to, the World Wide Web.

A "web page," as used here in, is a resource or document adapted for a network such as, but not limited to, the World Wide Web and which can be accessed by a "web browser" and displayed on a display device.

An "applet," as used here in, is a computer readable code that can be, included in a page of information sent over a network and, when the page is open in a web browser, the code is transferred to the system opening the page and executed in the web browser. "Applet," as used herein includes code components such as, but not limited to, Java applets and ActiveX components.

A "mobile communication device," as used herein, refers to a device capable of executing applications, and which is portable. In one instance, the mobile communication device has one or more processors and memory capability. Examples of mobile communication devices, these teachings not being limited to only these examples, include mobile phones, smart mobile phones, digital personal assistants, tablets, etc.

In one embodiment, the system of these teachings includes one or more sources of video data, and a server receiving the one or more video data streams originating from the one or more sources of video data, the server also providing the one or more video data streams to multiple users; each one of the multiple users being able to view and process the one or more video data streams.

In one instance, the system of these teachings also includes a gateway subsystem receiving the at least one video data stream from the at least one source of video data and providing the at least one source of video data to the server. In another instance, the gateway subsystem determines the appropriate video stream size that is sent to the Server.

In another embodiment, the system of these teachings includes one or more sources of video data, a server receiving one or more video data streams originating from the one or more sources of video data, and a number of user subsystems, the server providing the one or more video data streams to the number of user subsystems, In another instance, the server determines the appropriate video stream size that is sent to the user (for use with smaller screens example smartphones), each one of the number of user subsystems having viewing/processing components for viewing/processing the one or more video data streams.

One embodiment of the system of these teachings is shown in FIG. 1. As shown in FIG. 1, the present teachings incorporate five main components: 1) a source of video data 15, such as, but not limited to, one or more IP Video Cameras; 2) a Gateway 20, such as, but not limited to, a mini personal computer or mini central processing unit; 3) a network, such as but not limited to, the Internet and/or Intranet 30; 4) a Data Server 40; and 5) the Clients 50 (also referred to as users). It should be noted that embodiments in which the Gateway and the data server are one and the same are also within the scope of these teachings.

Figure 2:
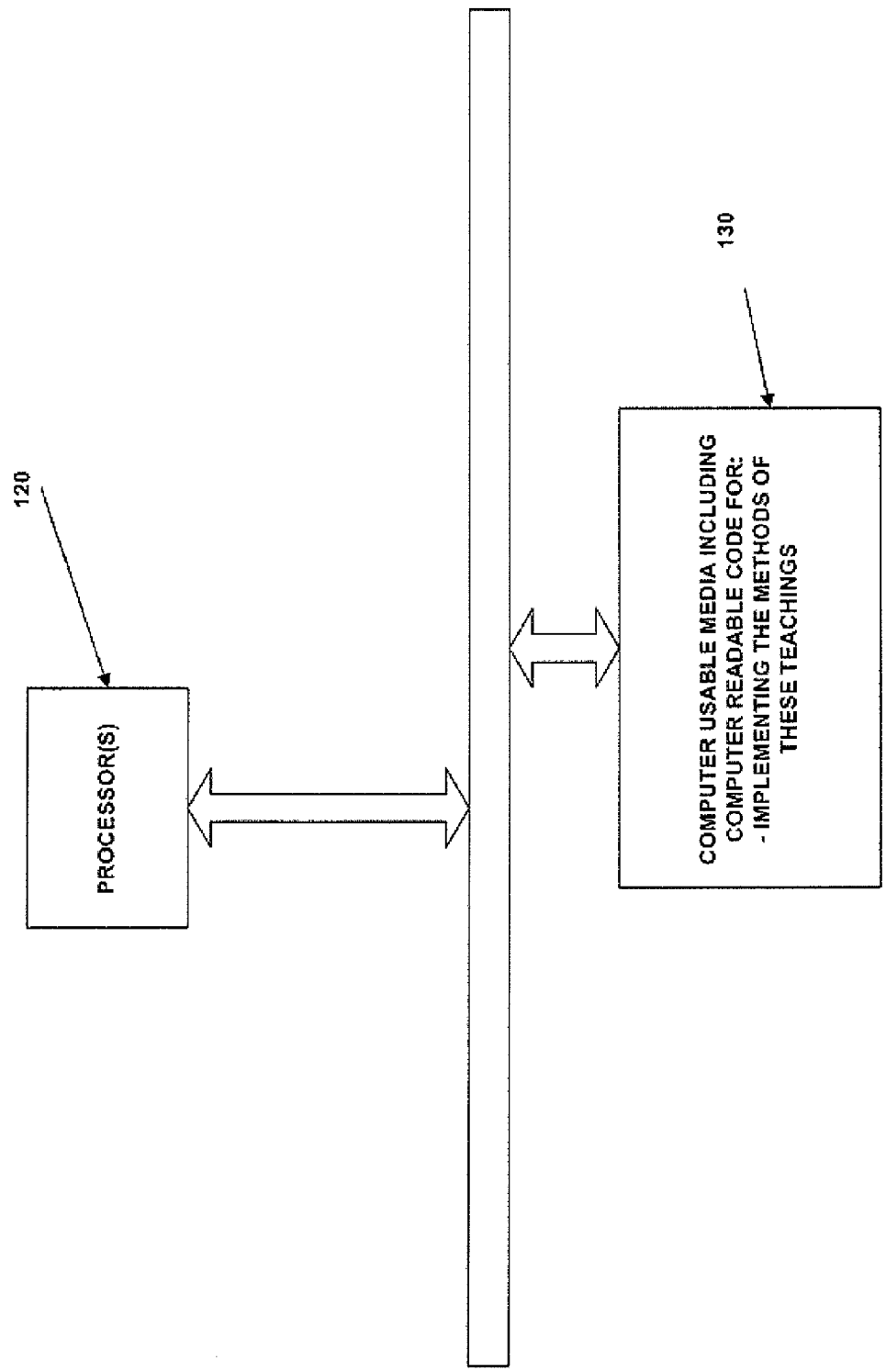
FIG. 2 is a schematic block diagram representation of one component of the embodiment of the system of these teachings shown in FIG. 1.

It should be noted that in one instance, the Gateway and/or the Server and/or at least one of the Clients includes, as shown in FIG. 2, one or more processors 120 and one or more computer usable media 130 that has computer readable code embodied therein, the computer readable code causing the one or more processors to execute at least a portion of the method of these teachings.

In one instance, each IP Video Camera 15 will submit a single video stream to the Gateway 20, which could consist of any image size (e.g. narrow or wide field of view) and configuration. In one instance, the stream comprises a wide-angle image compressed according to standard compression formats. In addition to channeling the IP Video Camera stream to the Data Server 40 via the Internet and/or Intranet 30, in one instance, the Gateway 20 also determines the appropriate video stream size that will be sent to the Data Server 40. By having the Gateway regulate the video streams, it will alleviate the burden on the network, thereby addressing one of the problems associated with the conventional technology.

In another instance, an analog camera is used instead of the IP Video Camera 15. In that instance, the Gateway 20 includes a video server, a server that converts analog video signals into IP video streams. The IP video stream serves as input to the method described hereinabove.

In one instance, at least one of the one or more sources of video data is a wide-angle or 360° optical system. In one instance, the wide-angle optical system includes a fisheye lens. It should be noted that a variety of catadioptric subsystems can be utilized instead of the fisheye lens.

In one embodiment, at least one client (also referred to as a user subsystem) 50 includes at least one processor and at least one computer usable medium having computer readable code embodied therein, the computer readable code causing the at least one processor to view/process the one or more video data streams. Processing of the one or more video data streams can include correcting the wide-angle image, selecting a privacy region in the image and tracking moving objects using methods such as, but not limited to, those described in U.S. Pat. No. 7,529,424, entitled "Correction of optical distortion by image processing," U.S. Pat. No. 7,893,985, entitled "Wide angle electronic camera with improved peripheral vision," U.S. Pat. No. 7,366,359, entitled "Image processing of regions in a wide angle video camera," U.S. Pat.

No. 7,450,165, entitled "Multiple-view processing in wide-angle video camera," and U.S. Pat. No. 7,528,881, entitled "Multiple object processing in wide-angle video camera," and in U.S. Patent Application Publication 2008/0211903, entitled "Image processing of regions in a wide angle video camera," all of which are Incorporated by reference herein in their entirety for all purposes.

In another embodiment, processing of the one or more video data streams can include correcting a wide-angle image from a wide-angle camera, selecting a region of interest in the image, determining the coordinates of one or more pixels and providing the coordinates to a PTZ camera (in one instance substantially collocated with the wide-angle camera).

In one instance, the computer readable code in the at least one computer usable medium at the client also causes the at least one processor to select a region of interest from video data from the wide-angle optical subsystem and receive other video data, the other video data corresponding to the region of interest. (In one instance, the methods disclosed in U.S. Pat. Nos. 7,366,359, 7,450,165, and 7,528,881 and in U.S. Patent Application Publication 2008/0211903 can be utilized.)

In another instance, at least one of the one or more sources of video data comprises a wide-angle optical sub-system and at least one narrow field of view optical sub-system. (See, for example, the system shown in U.S. Pat. No. 6,215,519, incorporated by reference herein in its entirety for all purposes; it should be noted that depth information is not always necessary in the present teachings.) In that instance, the other video data is received from the at least one narrow field of view optical sub-system. In one instance, the at least one narrow field of view optical sub-system is a pan-tilt-zoom (PTZ) optical sub-system.

In one embodiment, during operation, the one or more clients (each also referred to as a user subsystem) 50 receive a web page from the server 40 (in one instance, the operation is initiated by the user 50 requesting a webpage from the server 40). In this embodiment the viewing/processing, at the one or more clients 50, of the one or more video data streams occurs through the web page being viewed in a web browser and the necessary tools to perform manipulations and analyze the video data stream are provided to each client 50 through applets (the term "applet" is used herein according to the generalized definition provided hereinabove). (See, for example, R. Orfall and D. Harkey, "Client/Server Programming with Java and CORBA" (ISBN 0-471-24578-X, pp. 83-95 and pp. 231-236, Incorporated by reference herein in their entirety for all purposes.) The tools or applications can include any or all of the applications disclosed hereinabove.

Figure 3:
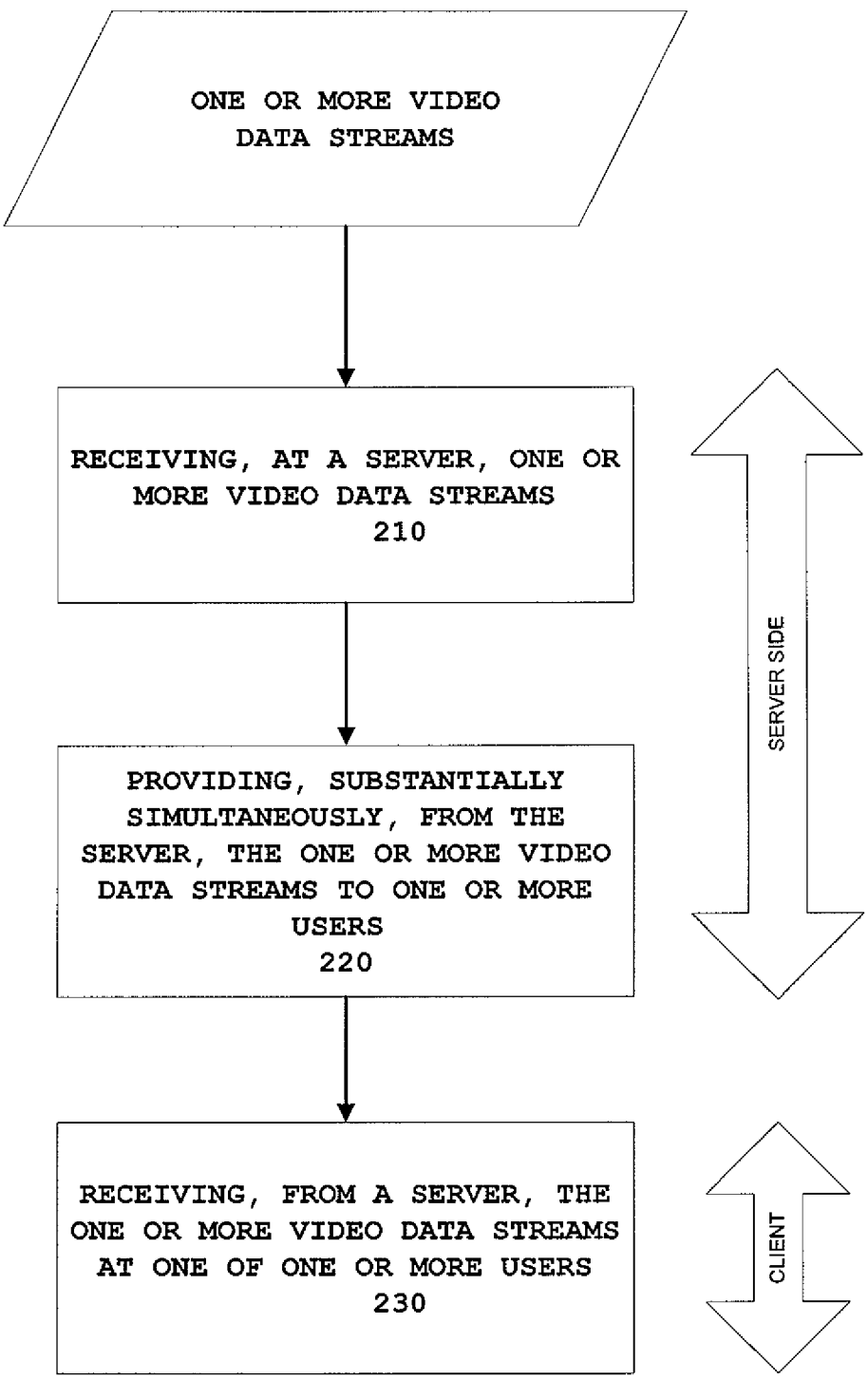
FIG. 3 is a flowchart representation of one embodiment of the method of these teachings.

In one embodiment, the method of these teachings includes receiving, at a server, one or more video data streams (step 210, FIG. 3) and providing, from the server, the one or more video data streams to one or more ("multiple") users (step 220, FIG. 3), each one of the multiple users being able to view and manipulate the one or more video data streams. In one instance, the one or more video data streams can be provided substantially simultaneously to the users (clients) so that, within the limits of processing and retrieving times, the users perceive that they are receiving the information directly from the sources of video data.

In another embodiment, as operated at the client (user) site, the method of these teachings includes receiving, from a server, one or more video data streams at one of multiple users (step 230, FIG. 3), the one or more video data streams being capable of being received by other of the multiple users and having been initially received at the server from one or more sources of video data.

In one instance, the one or more video data streams originate from one or more sources of video data. In one embodiment, the one or more sources of video data include one or more wide-angle optical systems.

In one instance, the one or more video data streams are received from the Gateway system, the Gateway system receiving the one or more video data streams from one or more sources of video data. In another instance, the Gateway system determines the appropriate video stream size to be sent to the server. It should be noted that this operation can be performed without removing any part of the image or adjusting the image.

The method of operation of one embodiment of these teachings is disclosed herein below. It should be noted that the hereinbelow disclosure is not meant to be limiting. Once a single video data stream from an IP Video Camera 15 passes through the Gateway 20, the Data Server 40 will either store the data for later viewing or immediately push the data via an Internet and/or Intranet connection to a Client 50. The Data Server 40 will also have the ability to reduce the size of the video data stream to accommodate the system limitations and/or requirements of a Client 50. (In one instance, the reduction of the size of the video data stream is performed at the Gateway 40.) The reduced data stream, however, would not remove any part of the image or adjust the image in any manner, as the only reduction will be to the size and pixilation of the video stream being sent to the Client. This is useful if the Client is a small electronic device such as a Smartphone, which would most likely not be able to process the full video data stream.

Once a live or recorded video data stream is transmitted to a Client, the Client will have the ability to view and manipulate the video data stream as each Client will be receiving its own video data stream from the Data Server. To accomplish this task, each Client will be enabled with the necessary tools to perform manipulate and analyze the data stream on the Client system. As such, each Client will have the ability to perform image correction (e.g. de-warp) on the transmitted video data stream and once the necessary image correction is accomplished, the user of the Client would be able to manipulate the image (e.g. pan/tilt/zoom) to the users desired view. In addition to being able to operate on the image, each Client may also have the ability to perform independent analytics associated with each Client's task (the term "manipulating," as used herein, includes both operating on the image and performing analytics). Since Data Server is simply sending out a single data stream to each Client and because the single data stream contains all of the data transmitted from the camera, each Client is enabled to independently manipulate and analyze its data stream without directly accessing the camera or interfering with other users. This process will allow each Client to use different analytic tools and management settings without conflicting other Clients or reducing the flow of information to the Client. Examples of such task and analytics include tracking object, various alarm triggering events, color correction, privacy zone etc.

Figure 4:
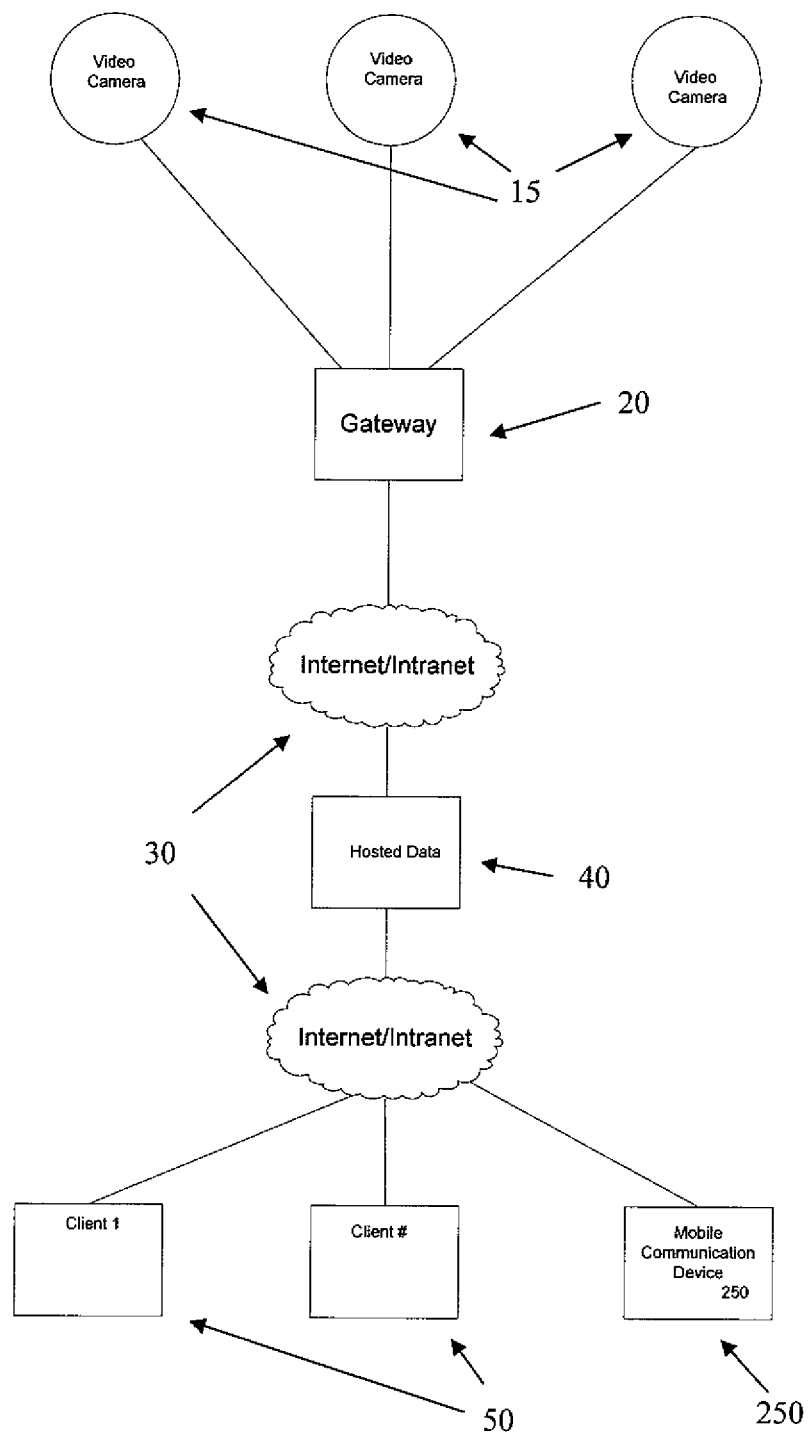
FIG. 4 is a block diagram representation of another embodiment of the system of these teachings.

In one instance, at least one of the clients 50 includes a mobile communication device 250, as shown in FIG. 4. In order to substantially simultaneously remotely monitor one or more regions by at least one mobile communication device, one or more video data streams are received, substantially simultaneously, from a server 40, at one or more mobile communication devices 250; each one of the one or more mobile communication devices being able to view and manipulate the one or more video data streams. In one instance, the one or more received video data streams are processed according to predetermined processing requirements.

In one instance, the one or more video data streams originate from one or more sources of video data. In one embodiment, the one or more sources of video data include a wide-angle optical system, for example, but not limited to, a fisheye lens. In one instance, the received one or more video data streams are processed, at the mobile communication device, in order to reduce distortion. The processing, in one instance, includes de-warping.

The embodiment shown in FIG. 4 includes five main components: 1) a source of video data 15, such as, but not limited to, one or more IP Video Cameras; 2) a Gateway 20, such as, but not limited to, a mini personal computer or mini central processing unit; 3) a network, such as but not limited to, the Internet and/or Intranet 30; 4) a Data Server 40; and 5) one or more users, such as clients 50, at least some of which are mobile communication devices 250. It should be noted that embodiments in which the Gateway and the data server are one and the same are also within the scope of these teachings. The instances and embodiments of the sources of video data 15, the Gateway 20, the network 30 and the data server 40 disclosed hereinabove also relate to the embodiment shown in FIG. 4.

Figure 5:
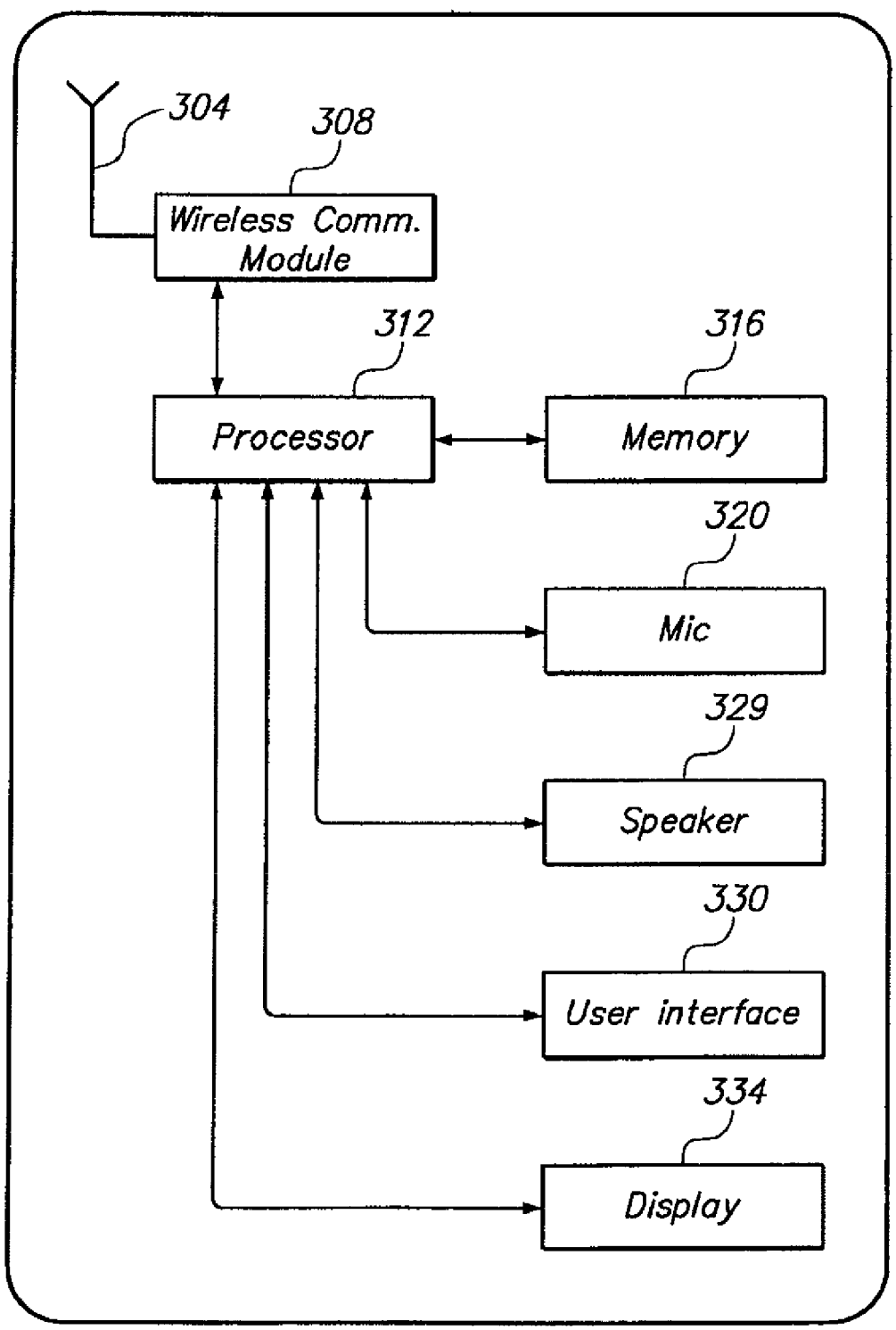
FIG. 5 is a schematic block diagram representation of one embodiment of the mobile communication device in the embodiment of the system of these teachings shown in FIG. 4.

FIG. 5 shows a block diagram of one exemplary embodiment of a mobile communication device. It should be noted that other embodiments are also within the scope of these teachings. The mobile communication device shown in FIG. 5 includes an antenna 304 configured to send receive signals over a network. The antenna 304 is operatively connected to a communication module 308 that provides an interface between the antenna and the network and one or more processors 312. The one or more processors 312 are configured to execute machine readable code which is stored on computer readable media 316 (such as a memory, as shown). The one or more processors 312 are also configured to store computer readable code in the computer readable media 316. The mobile communication device shown in FIG. 5 also has a display 334 configured to present information, such as portions of the one or more video data streams, to a user. A user interface 330 is configured to receive user input and provided to the one or more processors 312. In one instance, the user interface 330 is configured as part of the display 334, as, for example, in a touch screen display. In the exemplary embodiment shown in FIG. 5, the mobile communication device also includes a microphone 320 and a speaker 329.

In one embodiment, the computer readable media 316 in the mobile communication device has computer readable code that causes the one or more processors 312 to view/process the one or more video data streams. In one instance where one or more of the sources of video data includes a wide-angle optical system, the computer readable code causes the one or more processors 312 to dewarp images in the one or more video data streams. In another instance where one or more of the sources of video data includes a wide-angle optical system, the computer readable code causes the one or more processors 312 to select a region of interest from video data from the wide-angle optical system.

In one exemplary embodiment, computer readable code in the mobile communication device implements image warping or dewarping using texture mapping between two meshes. The implementation of warping or de-warping using texture mapping can be used to correct distortion. (Transformation methods such as those disclosed in U.S. Pat. No. 6,323,862 by Ford Oxaal, which is herein incorporated by reference in its entirety and for all purposes, can also be used.) In the exemplary embodiments in which the graphics API in the computer readable code is OpenGL, a number of the OpenGL functions can be used for texture mapping and warping/de-warping (see, for example, Programming with OpenGL: Advanced Techniques, SIGGRAPH '97 Course, which is Incorporated by reference herein in its entirety and for all purposes). in its entirety and for all purposes, can also be used.) In the exemplary embodiments in which the graphics API in the computer readable code is OpenGL, a number of other options, the size texture mapping, are available for warping/de-warping. For example, these teachings not being limited only to those examples, the pixel zoom operation in OpenGL can be used in dewarping.

Figure 6:
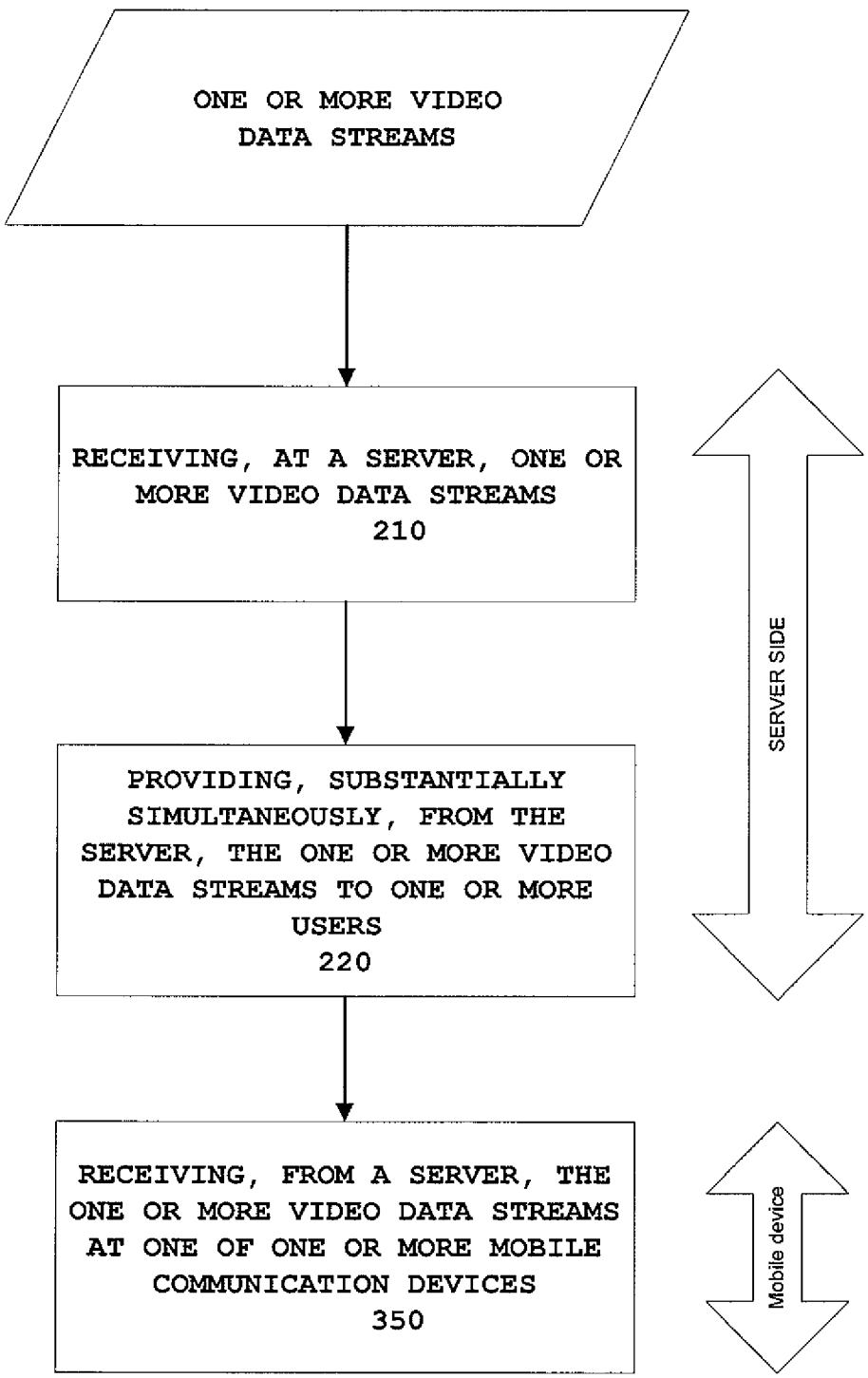
FIG. 6 is a flowchart representation of another embodiment of the method of these teachings.

In embodiments of the method of these teachings operated at the mobile communication device, the method of these teachings includes receiving, from a server, one or more video data streams at one of multiple users (step 350, FIG. 6), the one or more video data streams being capable of being received by other of the one or more mobile communication devices or use and having been initially received at the server from one or more sources of video data. In one instance the method also includes processing the received one or more video data streams according to predetermined processing requirements, the predetermined processing requirements being characteristic of the mobile communication device at which the processing is occurring. In one instance, the one or more video data streams are processing in order to reduce distortion. The processing, as described hereinabove, can include dewarping. The operation of the server, and, in some embodiments, of the Gateway, and characteristics of the video data stream disclosed hereinabove in reference to FIG. 3, also apply to FIG. 6.

For the purposes of describing and defining the present teachings, it is noted that the term "substantially" is utilized herein to represent the inherent degree of uncertainty that may be attributed to any quantitative comparison, value, measurement, or other representation. The term "substantially" is also utilized herein to represent the degree by which a quantitative representation may vary from a stated reference without resulting in a change in the basic function of the subject matter at issue.

Elements and components described herein may be further divided into additional components or joined together to form fewer components for performing the same functions.

Each computer program may be implemented in any programming language, such as assembly language, machine language, a high-level procedural programming language, or an object-oriented programming language. The programming language may be a compiled or interpreted programming language.

Each computer program may be implemented in a computer program product tangibly embodied in a computer-readable storage device for execution by a computer processor. Method steps of the invention may be performed by a computer processor executing a program tangibly embodied on a computer-readable medium to perform functions of the invention by operating on input and generating output.

Common forms of computer-readable media include, for example, a floppy disk, a flexible disk, hard disk, magnetic tape, or any other magnetic medium, a CDROM, any other optical medium, any physical medium with patterns of holes, a RAM, a PROM, and EPROM, a FLASH-EPROM, any other memory chip or cartridge, all of which are non-transitory. As stated in the USPTO 2005 Interim Guidelines for Examination of Patent Applications for Patent Subject Matter Eligibility, 1300 Off. Gaz. Pat. Office 142 (Nov. 22, 2005), "On the other hand, from a technological standpoint, a signal encoded with functional descriptive material is similar to a computer-readable memory encoded with functional descriptive material, in that they both create a functional interrelationship with a computer. In other words, a computer is able to execute the encoded functions, regardless of whether the format is a disk or a signal."

Although the teachings have been described with respect to various embodiments, it should be realized these teachings are also capable of a wide variety of further and other embodiments within the spirit and scope of the appended claims.

What is claimed is:

1. A method for substantially simultaneously remote monitoring by at least one mobile communication device, the method comprising the steps of:
receiving at one or more mobile communication devices, substantially simultaneously, from a server, one or more video data streams; the one or more video data streams received at the server from one or more sources of video data; the one or more mobile communication devices receiving the one or more video data streams in their entirety rather than identifying to receive a required portion of the one or more video data streams; each one of the one or more mobile communication devices being able to view and manipulate the one or more video data streams; wherein manipulating, as performed by at least one of the one or more mobile communication devices, includes at least one of selecting a privacy region, tracking moving objects, selecting a region of interest, image correction, color correction or alarm triggering;
wherein monitoring includes remote video, camera viewing and control, where the video camera use includes crowd control, inventory monitoring, traffic monitoring and security purposes.

2. The method of claim 1 further comprising the step of processing the received one or more video data streams according to predetermined processing requirements; the predetermined processing requirements being characteristic of the one of the one or more mobile communication devices.

3. The method of claim 1 wherein at least one of the one or more sources of video data comprises a wide-angle optical system.

4. The method of claim 3 wherein the wide-angle optical system comprises a. fisheye lens.

5. The method of claim 1 wherein the one or more video data streams are received from a gateway system, the gateway system receiving the one or more video data streams from one or more sources of video data.

6. The method of claim 3 further comprising of processing the received one or more video data streams in order to reduce distortion.

7. The method of claim 6 wherein the processing comprises dewarping.

8. A system for substantially remote monitoring by multiple users, the system comprising:
a server receiving one or more video data streams from one or more sources of video data.;
one or more mobile communication devices;
said server providing, substantially simultaneously, said one or more video data streams to said one or more mobile communication devices; the one or more mobile communication devices not identifying a required portion of the one or more video data streams; each one of the one or more mobile communication devices comprising viewing/processing components for viewing/processing said one or more video data streams; wherein viewing/processing includes at least one of selecting a privacy region, tracking moving objects, selecting a region of interest, image correction, color correction or alarm triggering;
wherein remote monitoring includes remote video camera viewing and control where the video camera use includes crowed control, inventory monitoring, traffic monitoring and security purposes.

9. The system of claim 8 wherein said server comprises:
at least one processor; and
at least one non-transitory computer usable medium having computer readable code embodied therein, said computer readable code causing said at least one processor to:
receive said one or more video data streams originating from said one or more sources of video data; and
provide, substantially simultaneously, one or more video data streams to said one or more mobile communication devices.

10. The system of claim 9 wherein the non-transitory computer readable code also causes said at least one processor to adjust one video data stream in order to meet requirements of one of said one or more mobile communication devices.

11. The system of claim 8 further comprising a gateway subsystem receiving said one or more video data streams from said one or more sources of video data and providing said one or more sources of video data to said server.

12. The system of claim 11 wherein said gateway subsystem comprises:
at least one processor; and
at least one non-transitory computer usable medium having computer readable code embodied therein, said computer readable code causing said at least one processor to:
receive said one or more video data streams originating from said one or more sources of video data; and
provide said one or more video data streams to said server.

13. The system of claim 8 wherein at least one of the one or more sources of video data comprises a wide-angle optical system.

14. The system of claim 13 wherein the wide-angle optical system comprises a fisheye lens.

15. The system of claim 8 wherein at least one mobile communication device from said one or mobile communication devices comprises:
at least one processor; and
at least one non-transitory computer usable medium having computer readable code embodied therein, said computer readable code causing said at least one processor to:
view/process said one or more video data streams.

16. The system of claim 15 wherein at least one of the one or more sources of video data comprises a wide-angle optical system; and wherein the non-transitory computer readable code causing said at least one processor to view/process said one or more video data streams causes said at least one processor to dewarp images in said one or more video data streams.

17. A mobile device comprising:
at least one processor; and
at least one non-transitory computer usable medium having computer readable code embodied therein, said computer readable code causing said at least one processor to:
receiving one or more video data streams from a server; said server receiving said one or more video data streams from one or more sources of video data; the one or more mobile communication device not identifying a required portion of the one or more video data streams; and viewing/processing said one or more video data streams; wherein viewing/processing includes at least one of selecting a privacy region, tracking moving objects, selecting a region of interest, image correction, color correction or alarm triggering.

18. The mobile device of claim 17 wherein at least one of the one or more sources of video data comprises a wide-angle optical system; and wherein the non-transitory computer readable code causing said at least one processor to view/process said one or more video data streams causes said at least one processor to dewarp images in said one or more video data streams.

19. The mobile device of claim 17 wherein at least one of the one or more sources of video data comprises a wide-angle optical system; and wherein the non-transitory computer readable code also causes said at least one processor to:

select a region of interest from video data from said wide-angle optical system.

* * * * *

UNITED STATES PATENT AND TRADEMARK OFFICE
CERTIFICATE OF CORRECTION

| | | |
|---|---|---|
| PATENT NO. | : 9,065,983 B2 | Page 1 of 1 |
| APPLICATION NO. | : 13/530507 | |
| DATED | : June 23, 2015 | |
| INVENTOR(S) | : Richard Pineau et al. | |

It is certified that error appears in the above-identified patent and that said Letters Patent is hereby corrected as shown below:

IN THE CLAIMS

In column 9, line 44 (claim 4), "a. fisheye lens" should read -- a fisheye lens --

In column 10, line 6 (claim 8), "crowed control" should read -- crowd control --

In column 11, line 1 (claim 17), "communication device" should read -- communication devices --

Signed and Sealed this
Twenty-seventh Day of October, 2015

Michelle K. Lee
*Director of the United States Patent and Trademark Office*